United States Patent
Sawai et al.

(10) Patent No.: US 10,890,256 B2
(45) Date of Patent: Jan. 12, 2021

(54) SEAL STRUCTURE OF HIGH-PRESSURE TANK

(71) Applicants: TOYODA GOSEI CO., LTD., Kiyosu (JP); TOYOTA JIDOSHA KABUSHIKI KAISHA, Toyota (JP)

(72) Inventors: Osamu Sawai, Okazaki (JP); Kosuke Kusaba, Kiyosu (JP)

(73) Assignees: TOYODA GOSEI CO., LTD., Aichi-pref. (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 16/383,841

(22) Filed: Apr. 15, 2019

(65) Prior Publication Data

US 2019/0316681 A1    Oct. 17, 2019

(30) Foreign Application Priority Data

Apr. 16, 2018 (JP) ................... 2018-078681

(51) Int. Cl.
*F16J 15/16* (2006.01)
*F16C 13/06* (2006.01)
*F17C 13/06* (2006.01)

(52) U.S. Cl.
CPC ............. *F16J 15/164* (2013.01); *F17C 13/06* (2013.01); *F16J 15/166* (2013.01); *F17C 2201/0109* (2013.01)

(58) Field of Classification Search
CPC ........ F16J 15/061; F16J 15/127; F16J 15/166; F16J 15/164; F17C 13/06
(Continued)

(56) References Cited

U.S. PATENT DOCUMENTS 4,231,578 A * 11/1980 Traub ............... F16F 9/363
277/572
4,268,045 A * 5/1981 Traub ............... F16F 9/363
277/589

(Continued)

FOREIGN PATENT DOCUMENTS

JP    2007-132497 A    5/2007
JP    2007-146946 A    6/2007
(Continued)

OTHER PUBLICATIONS

Office Action dated Apr. 16, 2020 issued in corresponding JP patent application No. 2018-078681 (and English translation).

*Primary Examiner* — Nicholas L Foster
(74) *Attorney, Agent, or Firm* — Posz Law Group, PLC (57) ABSTRACT

A seal structure of a high-pressure tank including: the first member in which a tank chamber is formed inside; and the second member which is fitted into the opening hole of the first member and provided with an annular groove formed on an outer peripheral surface, the seal structure includes: a seal member, having an annular shape, configured to be disposed on the tank chamber side in the groove; and a first back-up member and a second back-up member configured to be disposed further to the side opposite to the tank chamber side than the seal member in the groove, to include inclined surface parts respectively opposite to each other. The inclined surface part of the first back-up member includes a crest folding corner part in which a first low angle inclined part and a first high angle inclined part are connected to each other.

5 Claims, 5 Drawing Sheets

(58) Field of Classification Search
USPC .......................................................... 277/638
See application file for complete search history.

(56) References Cited

U.S. PATENT DOCUMENTS

| | | | | |
|---|---|---|---|---|
| 5,879,010 | A * | 3/1999 | Nilkanth | ............. E21B 33/1216 |
| | | | | 277/545 |
| 7,341,258 | B2 * | 3/2008 | Holt | ....................... F16J 15/166 |
| | | | | 277/584 |
| 7,900,935 | B2 * | 3/2011 | Kanagae | ................ F16J 15/166 |
| | | | | 277/584 |
| 9,243,713 | B2 * | 1/2016 | Miura | .................... F16J 15/166 |
| 9,752,682 | B2 * | 9/2017 | Winkelmann | ......... F16J 15/166 |
| 10,344,865 | B2 * | 7/2019 | Henmi | ................ F16J 15/3224 |
| 10,458,598 | B2 * | 10/2019 | Kanezaki | ................... F17C 1/02 |
| 10,487,982 | B2 * | 11/2019 | Sawai | ....................... F17C 1/16 |
| 2006/0066058 | A1 * | 3/2006 | Holt | ..................... F16J 15/3236 |
| | | | | 277/584 |
| 2009/0121443 | A1 | 5/2009 | Kanagae | |
| 2013/0069362 | A1 * | 3/2013 | Miura | .................... F16J 15/166 |
| | | | | 285/202 |
| 2014/0070494 | A1 * | 3/2014 | Winkelmann | ......... F16J 15/166 |
| | | | | 277/314 |
| 2016/0356381 | A1 | 12/2016 | Henmi et al. | |
| 2017/0292607 | A1 * | 10/2017 | Monma | ................. F16J 15/166 |
| 2018/0266630 | A1 * | 9/2018 | Kanezaki | ................ F17C 13/06 |
| 2018/0372223 | A1 | 12/2018 | Yoshitsune et al. | |
| 2019/0049067 | A1 * | 2/2019 | Sawai | ....................... F17C 1/16 |

FOREIGN PATENT DOCUMENTS

| | | |
|---|---|---|
| JP | 2010-190314 A | 9/2010 |
| JP | 2010-249239 A | 11/2010 |
| WO | 2015/133595 A1 | 9/2015 |
| WO | 2017/104278 A1 | 6/2017 |

* cited by examiner

FIG.4 AT TIME OF ASSEMBLY

FIG.5 AFTER FILLING GAS

SEAL STRUCTURE OF HIGH-PRESSURE TANK

CROSS-REFERENCE TO RELATED APPLICATION(S)

This application is based upon and claims the benefit of priority from Japanese Patent Application No. 2018-078681, filed on Apr. 16, 2018, the entire contents of which are incorporated herein by reference.

BACKGROUND

1. Field of the Invention

The present invention relates to a seal structure of a high-pressure tank applied to a container having a high internal pressure such as, for example, a hydrogen tank, and the like.

2. Description of the Related Art

In a related art, a seal structure of a high-pressure tank applied to a hydrogen tank, and the like is known (for example, JP-A-2007-146946). The high-pressure tank described in JP-A-2007-146946 includes a first member formed in a cylindrical shape and a second member formed in a columnar shape. A tank chamber is formed inside the first member. Further, an opening hole is provided at an end part in an axial direction of the first member. The second member has a shaft body fitted into the opening hole of the first member. The shaft body of the second member is fitted into the opening hole so as to close the opening hole of the first member.

An annular mounting groove is provided on an outer peripheral part of the second member. Further, the high-pressure tank is provided with a seal member for sealing a space between the first member and the second member. The seal member is mounted on the mounting groove of the second member. The seal member includes a seal ring such as an O ring, and the like; and two back-up rings on which tapered surfaces are respectively formed separately from the seal ring.

The seal ring is disposed on the tank chamber side at the inside of the mounting groove of the second member. After the first member and the second member are assembled to each other and gas is filled into the tank chamber, the seal ring is pressed and moved in an axial direction opposite to the tank chamber side by the pressure of the tank chamber in the mounting groove. Further, the two back-up rings are disposed further to the side opposite to the tank chamber side than the seal ring in the mounting groove of the second member. The two back-up rings respectively include inclined surface parts opposite to each other. The two back-up rings are disposed so as to be adjacent to each other in the axial direction in a state where the inclined surface parts respectively inclined in the axial direction are opposite to each other. The two back-up rings are slid in a state where the inclined surface parts abut on each other by being pressed against the seal ring that is moved by the pressure of the tank chamber, and then are deformed so that the whole width in a radial direction becomes large, that is, the whole diameter is enlarged.

When the deformation of the back-up ring occurs, a gap in the radial direction between the first member and the second member is closed by the back-up ring. Therefore, even when the seal ring is pressed by high-pressure gas and is crushed from the high-pressure side to the low-pressure side, the seal ring can be prevented from entering the gap in the radial direction. Accordingly, a seal function by the seal ring can be sufficiently performed, and further, the seal ring can be prevented from entering the gap in the radial direction and thus can be prevented from being partially damaged.

In the high-pressure tank described in JP-A-2007-146946, an angle at which the respective inclined surface parts of the two back-up rings are inclined in the axial direction is a uniform angle that does not change depending on a position. Therefore, as an amount of relative displacement in the axial direction between the two back-up rings increases, an amount of deformation in the radial direction of the whole two back-up rings (that is, an amount of diameter enlargement) proportionally increases. Therefore, when the seal ring presses the two back-up rings by the pressure of the tank chamber, there exists a possibility that a load applied to an inner peripheral surface of the first member by the deformed back-up ring may become excessive. Particularly, when the first member is a member made of a resin, a situation in which the first member is broken by the load from the back-up ring may occur.

SUMMARY

The present invention has been made in consideration of the above-described problems and an object thereof is to provide a seal structure of a high-pressure tank not only capable of securing sealing properties by closing a gap in the radial direction between a first member and a second member by deformation in the radial direction of a back-up ring, but also capable of suppressing a pressing force in the radial direction from the back-up ring to the first member after the gap in the radial direction is closed.

According to an aspect of the invention, there is provided a seal structure of a high-pressure tank that seals a space between a first member having a cylindrical shape and a second member, the high-pressure tank including: the first member in which an opening hole is provided at an end part in the axial direction and a tank chamber is formed inside; and the second member which is fitted into the opening hole of the first member and provided with an annular groove formed on an outer peripheral surface, the seal structure including: a seal member, having an annular shape, configured to be disposed on the tank chamber side in the groove and to be moved by being pressed in the axial direction opposite to the tank chamber side by the pressure of the tank chamber; and a first back-up member and a second back-up member configured to be disposed further to the side opposite to the tank chamber side than the seal member in the groove, to include inclined surface parts respectively opposite to each other, and to be deformed so that the whole width in the radial direction becomes large by sliding therebetween which is caused by being pressed from the seal member moved by the pressure of the tank chamber in a state where the inclined surface parts abut on each other, wherein the inclined surface part of the first back-up member includes: a first low angle inclined part configured to be inclined at a predetermined angle with respect to the axial direction of the first member; a first high angle inclined part configured to be inclined at an angle larger than the predetermined angle with respect to the axial direction of the first member, and to generate abutting later than abutting timing at the first low angle inclined part at the time of the pressure from the seal member; and a crest folding corner part in which the first low angle inclined part and the first high angle inclined part are connected to each other.

According to the aspect of the invention, abutting between the first and second back-up members is generated at the first low angle inclined part having a relatively small inclination angle in the axial direction, after which the abutting therebetween is generated at the first high angle inclined part having a relatively large inclination angle in the axial direction. According to the abutting timing, since a pressing force applied in the radial direction from the second back-up member to the first back-up member can be increased by the first low angle inclined part, deformation in the radial direction of the first and the second back-up members can be promptly performed by the pressing of the seal member, thereby making it possible to promptly close the gap in the radial direction between the first member and the second member. Further, since the pressing force applied in the radial direction from the second back-up member to the first back-up member can be suppressed to be small by the first high angle inclined part, the pressing force in the radial direction from the first and second back-up members to the first member can be suppressed after the aforementioned gap in the radial direction is closed.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment and a modification of a seal structure of a high-pressure tank according to the present invention will be described in detail with reference to the accompany drawings.

Further, in the following embodiment, a container main body 10 corresponds to a "first member"; a mouthpiece 40 corresponds to a "second member"; an O ring 51 corresponds to a "seal member"; a second back-up ring 54 corresponds to a "first back-up member"; a first back-up ring 53 corresponds to a "second back-up member"; a second low angle inclined part 56a corresponds to a "first low angle inclined part"; a second high angle inclined part 56b corresponds to a "first high angle inclined part"; a first low angle inclined part 55a corresponds to a "second low angle inclined part"; and a first high angle inclined part 55b corresponds to a "second high angle inclined part".

Figure 1:
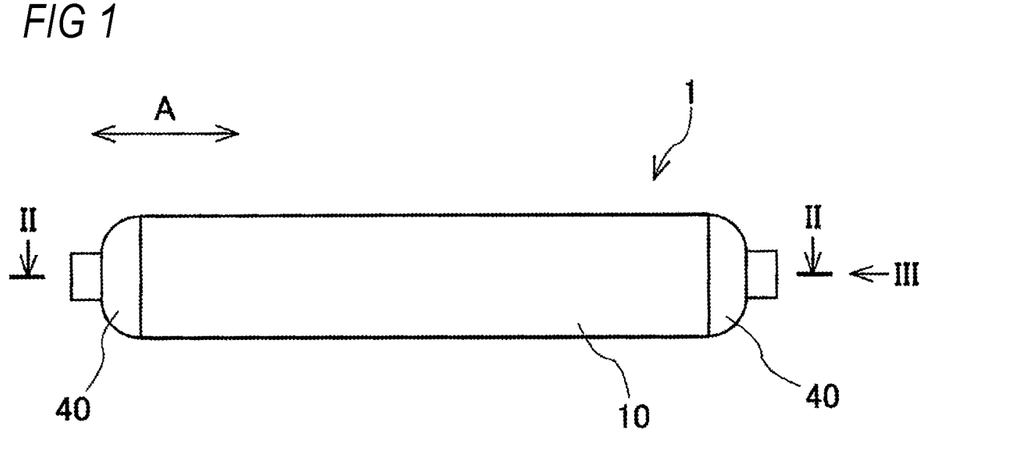
FIG. 1 is a front view of a high-pressure tank according to one embodiment of the present invention.
Figure 2:
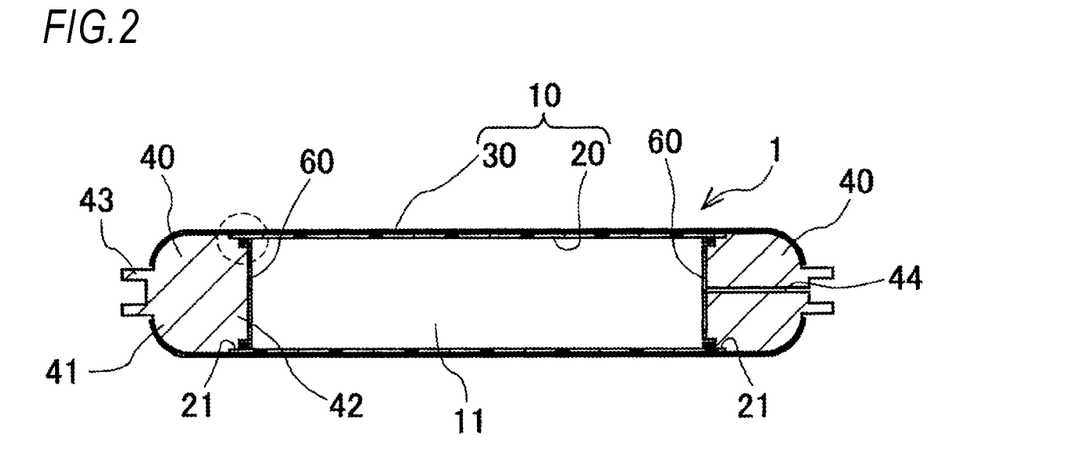
FIG. 2 is a cross-sectional view of the high-pressure tank according to the embodiment when the high-pressure tank is taken along the straight line II-II indicated in FIG. 1.
Figure 3:
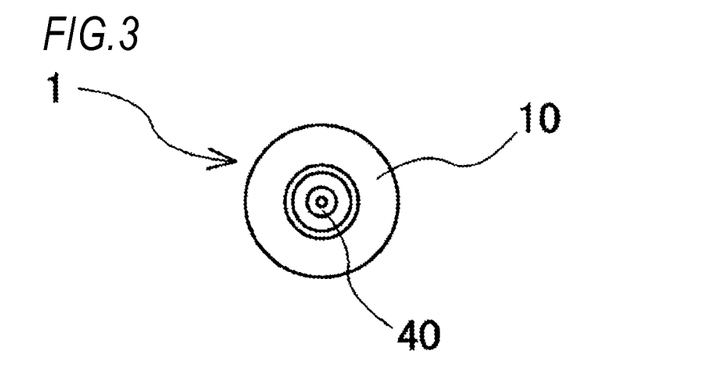
FIG. 3 is an arrow view when the high-pressure tank according to the embodiment is viewed in an arrow direction III indicated in FIG. 1.

A high-pressure tank 1 according to one embodiment is a tank capable of filling, for example, hydrogen gas, natural gas, and the like at a high pressure. The high-pressure tank 1 is mounted on, for example, an automobile, and the like. The high-pressure tank 1 is provided with the container main body 10 as illustrated in FIGS. 1 and 3. The container main body 10 is formed in an approximately cylindrical shape. As illustrated in FIG. 2, the container main body 10 is formed by double walls of an inner peripheral wall 20 and an outer peripheral wall 30. A tank chamber 11 is formed inside the container main body 10. Hereinafter, a direction in which an axis of the high-pressure tank 1 and an axis of the container main body 10 extend is appropriately referred to as an axial direction A.

The inner peripheral wall 20 is a hollow liner made of a resin formed of a material having gas barrier properties (for example, polyethylene, polypropylene, nylon, EVOH (ethylene vinyl alcohol copolymer), other resins, and the like). Further, the inner peripheral wall 20 may be a metal liner formed of a material such as, for example, aluminum, and the like. The inner peripheral wall 20 respectively has an approximately uniform outer diameter and inner diameter. The outer peripheral wall 30 is a fiber reinforced member formed of a high strength fiber such as a carbon fiber, a glass fiber, an aramid fiber, and the like impregnated with a thermosetting resin such as an epoxy resin, and the like. The outer peripheral wall 30 is formed by winding, tightening, and covering a high strength fiber around the outer surface side of the inner peripheral wall 20 by a filament winding method, and the like, and by curing (drying) the resin.

Circular-shaped opening holes 21 are respectively provided at opposite end parts in the axial direction of the inner peripheral wall 20. The high-pressure tank 1 also includes the mouthpiece 40. The mouthpiece 40 includes a dome part 41 formed in an approximately hemispherical shape; a fitting part 42 formed in a cylindrical shape capable of being fitted into the opening hole 21 of the inner peripheral wall 20 and extending inwardly in the axial direction A from the dome part 41; and a boss part 43 protruding outwardly in the axial direction A from the vicinity of an apex of the dome part 41.

The mouthpiece 40 is formed of a metal such as stainless steel, aluminum, and the like. The mouthpieces 40 are respectively mounted and fixed to the opposite end parts in the axial direction of the inner peripheral wall 20. The mounting and fixing of the mouthpiece 40 is realized by fitting the fitting part 42 into the opening hole 21 of the inner peripheral wall 20. The mouthpiece 40 is provided with a communication hole 44 that allows the outer side of the high-pressure tank 1 and the tank chamber 11 to communicate with each other. A valve (not illustrated) is mounted on the communication hole 44 of the mouthpiece 40 by screwing. The communication hole 44 of the mouthpiece 40 is closed by the valve.

The high-pressure tank 1 is manufactured in such a manner that the inner peripheral wall 20 of the container main body 10 and the mouthpiece 40 are assembled and mounted and fixed to each other, and an outer surface of an assembly structure of the inner peripheral wall 20 and the mouthpiece 40 is covered with the outer peripheral wall 30. When the high-pressure tank 1 is manufactured in this manner, the closed tank chamber 11 is formed at the inside (inside in the radial direction) of the inner peripheral wall 20 of the container main body 10. The closed tank chamber 11 is filled with gas. The filling of the gas into the tank chamber 11 can be performed up to a specified pressure (for example, 700 atmospheric pressure).

The inner peripheral wall 20 of the container main body 10 and the mouthpiece 40 are respectively formed so that an inner diameter of the inner peripheral wall 20 approximately coincides with an outer diameter of the fitting part 42 of the mouthpiece 40. Further, the maximum outer diameter of the dome part 41 of the mouthpiece 40 (specifically, an outer diameter of a part where the dome part 41 is connected to the fitting part 42) may be larger than the inner diameter of the inner peripheral wall 20.

Figure 4:
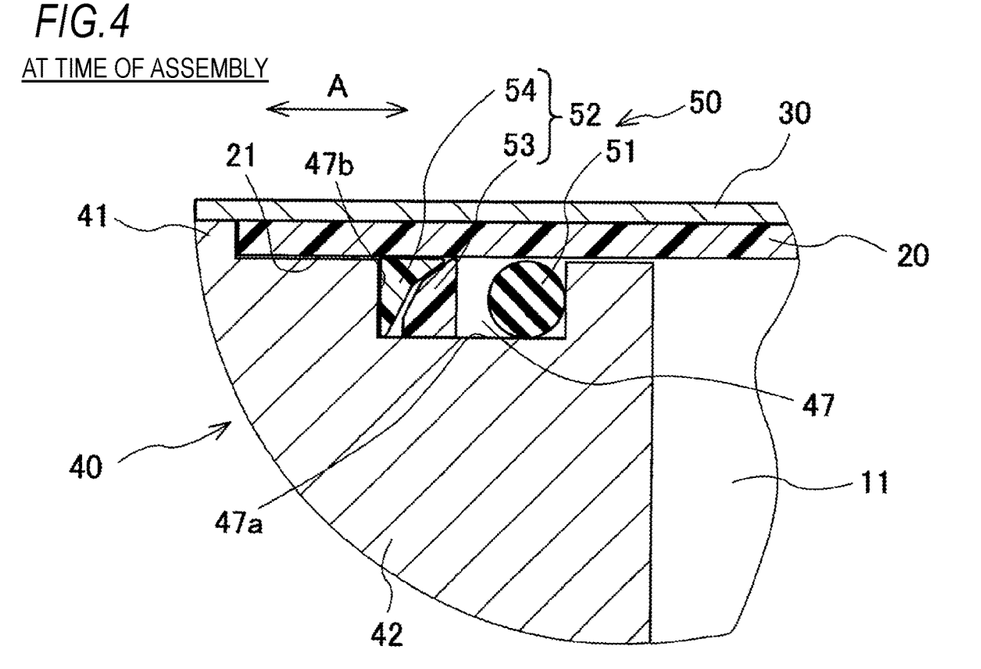
FIG. 4 is an enlarged cross-sectional view of a seal region indicated by a broken line in FIG. 2 of the high-pressure tank according to the embodiment when a container main body and a mouthpiece are assembled to each other.

The high-pressure tank 1 further includes a seal member 50 as illustrated in FIG. 4. The seal member 50 is a member that seals a space between the inner peripheral wall 20 of the container main body 10 and the mouthpiece 40 by closing a gap in the radial direction between an inner peripheral surface of the inner peripheral wall 20 and an outer peripheral surface of the mouthpiece 40 after the inner peripheral wall 20 of the container main body 10 and the mouthpiece 40 are assembled to each other.

A groove 47 is provided on an outer peripheral surface of a tip side in the axial direction of the fitting part 42 of the mouthpiece 40. The groove 47 is a mounting groove for mounting the seal member 50. The groove 47 is formed in an annular and belt shape. The seal member 50 is fitted into the groove 47 and mounted thereon. After the inner peripheral wall 20 of the container main body 10 and the mouthpiece 40 are assembled to each other, the groove 47 becomes a closed space in a state where the seal member 50 is disposed therein. Further, the groove 47 is partitioned from the tank chamber 11 via a support plate. Further, the closed state of the groove 47 includes a state in which a small gap where the groove 47 and the tank chamber 11 can communicate with each other is formed between an outer peripheral surface of the fitting part 42 and the inner peripheral surface of the inner peripheral wall 20.

The seal member 50 includes the O ring 51 and a back-up ring 52. The O ring 51 is a seal ring formed of an elastic material such as, for example, rubber, and the like. The O ring 51 is annularly formed so as to surround an outer periphery of a bottom wall 47a in the radial direction of the groove 47 in the fitting part 42 of the mouthpiece 40. An inner diameter of the O ring 51 is smaller than an outer diameter of the bottom wall 47a in the radial direction of the groove 47 in a natural state, and includes a tightening margin with respect to the bottom wall 47a in the radial direction.

The O ring 51 is disposed on the side of the tank chamber 11 in the groove 47. Further, an outer diameter of the O ring 51 is larger than the inner diameter of the inner peripheral wall 20 in a state of being mounted on the bottom wall 47a in the radial direction of the groove 47, and includes a tightening margin with respect to the inner peripheral wall 20. A cross sectional shape of the O ring 51 is an approximately circular shape.

The back-up ring 52 is disposed further to the side opposite to the side of the tank chamber 11 than the O ring 51 at the inside of the groove 47. The back-up ring 52 can seal the space between the inner peripheral wall 20 of the container main body 10 and the mouthpiece 40 by enlarging the diameter thereof from a natural state. The back-up ring 52 includes the first back-up ring 53 and the second back-up ring 54 which are formed separately from each other. The respective first and second back-up rings 53 and 54 are ring members formed of, for example, a resin material and a metal material. The respective first and second back-up rings 53 and 54 are annularly formed so as to surround the outer periphery of the bottom wall 47a in the radial direction of the groove 47 in the fitting part 42 of the mouthpiece 40.

The respective inner diameters of the first and second back-up rings 53 and 54 are approximately the same as the outer diameter of the bottom wall 47a in the radial direction of the groove 47 in the natural state. Further, the respective outer diameters of the first and second back-up rings 53 and 54 are approximately the same as the outer diameter of the fitting part 42 in the natural state, and are slightly smaller than the inner diameter of the inner peripheral wall 20. The first and second back-up rings 53 and 54 are disposed side by side in the axial direction A in the groove 47. The first back-up ring 53 is disposed closer to the side of the tank chamber 11 and closer to the inner side in the radial direction than the second back-up ring 54. The second back-up ring 54 is supported with respect to the mouthpiece 40 so as to be in contact with a side wall 47b in the axial direction forming a side wall of the groove 47 of the mouthpiece 40.

The first back-up ring 53 includes an inclined surface part 55. The second back-up ring 54 includes an inclined surface part 56. The inclined surface part 55 and the inclined surface part 56 are opposite to each other in an oblique direction with respect to the axial direction A. The inclined surface parts 55 and 56 are respectively formed in tapered shapes so as to be inclined with respect to the axial direction A.

A width in the radial direction of the annular first back-up ring 53 varies according to an axial direction position and is approximately constant over the whole periphery at the same axial direction position. Further, a width in the radial direction of the annular second back-up ring 54 varies according to an axial direction position and is approximately constant over the whole periphery at the same axial direction position. The maximum width value in the radial direction of the first back-up ring 53 and the maximum width value in the radial direction of the second back-up ring 54 are respectively smaller than a gap in the radial direction between the bottom wall 47a in the radial direction of the groove 47 of the mouthpiece 40 and the inner peripheral surface of the inner peripheral wall 20 after the assembly. Further, a length in the axial direction of the first back-up ring 53 varies according to the radial direction position, and is approximately constant over the whole periphery at the same radial direction position. A length in the axial direction of the second back-up ring 54 varies according to the radial direction position and is approximately constant over the whole periphery at the same radial direction position.

Specifically, the length in the axial direction of the first back-up ring 53 gradually increases from an outer diameter side position to an inner diameter side position. The width in the radial direction of the first back-up ring 53 gradually decreases from a position on the side of the tank chamber 11 in the axial direction A to a position on the side opposite thereto. Further, the length in the axial direction of the second back-up ring 54 gradually decreases from an outer diameter side position to an inner diameter side position. The width in the radial direction of the second back-up ring 54 gradually increases from the position on the side of the tank chamber 11 in the axial direction A to the position on the side opposite thereto. The first back-up ring 53 and the second back-up ring 54 are superimposed on each other in the axial direction A in a state where the inclined surface parts 55 and 56 are opposite to each other.

Figure 6:
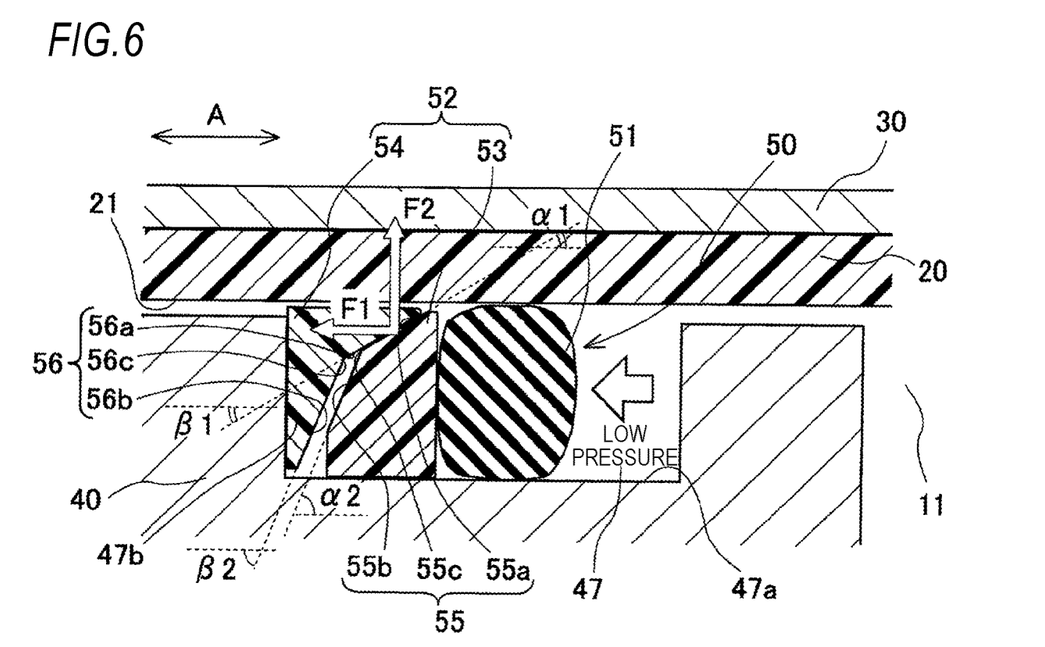
FIG. 6 is an enlarged cross-sectional view of a seal structure of the high-pressure tank according to the embodiment at an initial stage of pressure action from the tank chamber or at low pressure action therefrom.

As illustrated in FIG. 6, the inclined surface parts 55 and 56 of the first and second back-up rings 53 and 54 are respectively formed so that an angle inclined with respect to the axial direction A is changed. The inclined surface part 55 includes the first low angle inclined part 55a, the first high angle inclined part 55b, and a crest folding corner part 55c. The first low angle inclined part 55a and the first high angle inclined part 55b are connected to each other via the crest folding corner part 55c. The crest folding corner part 55c is formed in an annular shape over the whole periphery of an outer periphery of the first back-up ring 53. The crest folding corner part 55c crest-folds the inclined surface part 55 of the first back-up ring 53 into the first low angle inclined part 55a and the first high angle inclined part 55b.

The inclined surface part 56 includes the second low angle inclined part 56a, the second high angle inclined part 56b, and a root folding corner part 56c. The second low angle inclined part 56a and the second high angle inclined part 56b are connected to each other via the root folding corner part 56c. The root folding corner part 56c is formed in an annular shape over the whole periphery of an outer periphery of the second back-up ring 54. The root folding corner part 56c root-folds the inclined surface part 56 of the second back-up ring 54 into the second low angle inclined part 56a and the second high angle inclined part 56b.

The first low angle inclined part 55a of the inclined surface part 55 is a planar part inclined only by an angle $\alpha 1$ with respect to the axial direction A. The first high angle inclined part 55b is a planar part inclined only by an angle $\alpha 2$ with respect to the axial direction A. The angle $\alpha 2$ is larger than the angle $\alpha 1$. That is, the first high angle inclined part 55b is a part where an angle formed by a normal line with respect to the axial direction A is smaller than that of the first low angle inclined part 55a.

The first low angle inclined part 55a is positioned closer to the side of the tank chamber 11 in the axial direction A than the first high angle inclined part 55b. The inclined surface part 55 of the first back-up ring 53 is disposed so that the first low angle inclined part 55a is positioned on the side of the tank chamber 11 in the axial direction A and on the outer side in the radial direction and the first high angle inclined part 55b is positioned on the side opposite to the side of the tank chamber 11 in the axial direction A and on the inner side in the radial direction. The inclined surface part 55 of the first back-up ring 53 is crest-folded at the corner part 55c.

The length in the axial direction of the first back-up ring 53 gradually increases from an outermost diameter side position to a position of the corner part 55c of the inner diameter side at a constant rate, and also gradually increases from the position of the corner part 55c to an innermost diameter side position at a constant rate lower than the above-described constant rate. The width in the radial direction of the first back-up ring 53 gradually decreases from a position closest to the side of the tank chamber 11 in the axial direction A to a position in the axial direction of the corner part 55c at a constant rate, and also gradually decreases from the position in the axial direction of the corner part 55c to a position on the side most opposite to the side of the tank chamber 11 in the axial direction A at a constant rate exceeding the above-described constant rate.

Further, the first back-up ring 53 may be formed so as to have an end surface directed toward the axial direction A in such a manner that an end part on the side opposite to the side of the tank chamber 11 in the axial direction A is cut by a plane perpendicular with respect to the axial direction A. Further, in the same manner, the first back-up ring 53 may be formed so as to have an end surface directed outwardly in the radial direction in such a manner that the outermost diameter side end part is cut by a plane perpendicular with respect to the radial direction.

As described above, when the end part on the side opposite to the side of the tank chamber 11 of the first high angle inclined part 55b in the first back-up ring 53 is cut by the plane perpendicular with respect to the axial direction A, a sharp corner part of the tip part in the first back-up ring 53 is eliminated, whereby the first back-up ring 53 becomes hardly broken. Further, in the same manner, when the outermost diameter side end part in the first back-up ring 53 is cut by the plane perpendicular with respect to the radial direction, the first back-up ring 53 becomes hardly broken.

The second low angle inclined part 56a of the inclined surface part 56 is a planar part inclined only by an angle $\beta 1$ with respect to the axial direction A. The second high angle inclined part 56b is a planar part inclined only by an angle $\beta 2$ with respect to the axial direction A. The angle $\beta 2$ is larger than the angle $\beta 1$. That is, the second high angle inclined part 56b is a part where an angle formed by a normal line with respect to the axial direction A is smaller than that of the second low angle inclined part 56a. The angle $\beta 1$ corresponds to the angle $\alpha 1$ of the first low angle inclined part 55a of the inclined surface part 55 of the first back-up ring 53. Further, the angle $\beta 2$ corresponds to the angle $\alpha 2$ of the first high angle inclined part 55b of the inclined surface part 55 of the first back-up ring 53.

The second low angle inclined part 56a is positioned closer to the side of the tank chamber 11 in the axial direction A than the second high angle inclined part 56b. The inclined surface part 56 of the second back-up ring 54 is disposed so that the second low angle inclined part 56a is positioned on the side of the tank chamber 11 in the axial direction A and on the outer side in the radial direction and the second high angle inclined part 56b is positioned on the side opposite to the side of the tank chamber 11 in the axial direction A and on the inner side in the radial direction. The inclined surface part 56 of the second back-up ring 54 is root-folded at the corner part 56c.

The length in the axial direction of the second back-up ring 54 gradually decreases from an outermost diameter side position to a position of the corner part 56c of the inner diameter side at a constant rate, and also gradually decreases from the position of the corner part 56c to an innermost diameter side position at a constant rate lower than the above-described constant rate. The width in the radial direction of the second back-up ring 54 gradually increases from a position closest to the side of the tank chamber 11 in the axial direction A to a position in the axial direction of the corner part 56c at a constant rate, and also gradually increases from the position in the axial direction of the corner part 56c to a position on the side most opposite to the side of the tank chamber 11 in the axial direction A at a constant rate exceeding the above-described constant rate.

The first back-up ring 53 and the second back-up ring 54 are formed so that abutting between both the back-up rings 53 and 54 caused by pressing from the O ring 51 which will be described later starts between the first low angle inclined part 55a and an outer diameter side part of the second low angle inclined part 56a, and then is shifted to an inner diameter side part of the second low angle inclined part 56a. Further, the first back-up ring 53 and the second back-up ring 54 are formed so that the abutting between the both back-up rings 53 and 54 caused by the pressing from the O ring 51 which will be described later occurs between the first low angle inclined part 55a and the second low angle inclined part 56a, after which the abutting therebetween is shifted to occur between the first high angle inclined part 55b and the second high angle inclined part 56b.

Further, the second back-up ring 54 may be formed so as to have an end surface directed toward the axial direction A in such a manner that an end part on the side of the tank chamber 11 in the axial direction A is cut by a plane perpendicular with respect to the axial direction A. Further, in the same manner, the second back-up ring 54 may be formed so as to have an end surface directed inwardly in the radial direction in such a manner that the innermost diameter side end part is cut by a plane perpendicular with respect to the radial direction.

As described above, when the end part on the side of the tank chamber 11 of the second low angle inclined part 56a in the second back-up ring 54 is cut by the plane perpendicular with respect to the axial direction A, a sharp corner part of the tip part in the second back-up ring 54 is eliminated, whereby the second back-up ring 54 becomes hardly broken. Further, in the same manner, when the innermost diameter side end part of the second back-up ring 54 is cut by the plane perpendicular with respect to the radial direction, the second back-up ring 54 becomes hardly broken.

The second back-up ring 54 is formed to be capable of enlarging the diameter thereof from the natural state. For example, the annular shape of the second back-up ring 54 may become a shape with a slit partly cut in the circumferential direction. The second back-up ring 54 is in a state where the outer diameter thereof is approximately the same as the outer diameter of the fitting part 42 of the mouthpiece 40 or smaller than the inner diameter of the inner peripheral wall 20 until the second back-up ring 54 is pressed from the first back-up ring 53 abutting on the O ring 51 which will be described later, on the other hand, the outer diameter is enlarged by sliding between the inclined surface part 56 and the inclined surface part 55 of the first back-up ring 53 by being pressed by the transmission of a pressing force from the first back-up ring 53. The diameter enlargement of the second back-up ring 54 is continued until an outer peripheral surface of the second back-up ring 54 abuts on the inner peripheral surface of the inner peripheral wall 20 of the container main body 10.

Further, the first back-up ring 53 may be formed to be capable of reducing the diameter thereof from the natural state. In this case, for example, the annular shape of the first back-up ring 53 may become a shape with a slit partly cut in the circumferential direction. Further, in this case, when the first back-up ring 53 is in a state where the inner diameter thereof is slightly larger than the outer diameter of the bottom wall 47a in the radial direction of the groove 47, that is, a gap is formed between an inner peripheral surface of the first back-up ring 53 and the bottom wall 47a in the radial direction of the groove 47, the diameter thereof is reduced by sliding between the inclined surface part 55 and the inclined surface part 56 of the second back-up ring 54 by abutting on and being pressed against the O ring 51. The diameter reduction of the first back-up ring 53 is continued until the inner peripheral surface of the first back-up ring 53 abuts on the bottom wall 47a in the radial direction of the groove 47.

In the structure of the high-pressure tank 1 described above, when gas is filled into the tank chamber 11 after the inner peripheral wall 20 of the container main body 10 and the mouthpiece 40 are assembled to each other, the gas in the tank chamber 11 enters the groove 47 through a gap between the inner peripheral surface of the inner peripheral wall 20 of the container main body 10 and the outer peripheral surface of the mouthpiece 40.

When high-pressure gas enters the groove 47, first, the pressure of the high-pressure gas is applied to the O ring 51 disposed on the side of the tank chamber 11 in the groove 47, whereby the whole O ring 51 is pressed and moved in the axial direction A opposite to the side of the tank chamber 11. When such movement of the O ring 51 occurs, the O ring 51 abuts on an end surface directed to the axial direction A of the first back-up ring 53, whereby a pressing force for the movement toward the axial direction A is applied to the first back-up ring 53.

When the pressing force from the O ring 51 is applied to the first back-up ring 53 and thus the first back-up ring 53 is moved in the axial direction A opposite to the side of the tank chamber 11, the pressing force for moving the second back-up ring 54 outwardly in the radial direction is applied to the second back-up ring 54 from the first back-up ring 53 in a state where the second back-up ring 54 is supported by the mouthpiece 40 in such manner that the first back-up ring 53 abuts on the second back-up ring 54 and thus the second back-up ring 54 abuts on the side wall 47b in the axial direction of the groove 47.

The abutting between the first back-up ring 53 and the second back-up ring 54 by the pressing from the O ring 51 is performed between the inclined surface parts 55 and 56 of both the back-up rings 53 and 54. When such abutting is performed, both the inclined surface parts 55 and 56 slide while sliding. In this case, the whole back-up ring 52 including the first and second back-up rings 53 and 54 is deformed so that the diameter enlargement causing the outer diameter thereof to become enlarged occurs, or the diameter reduction causing the inner diameter thereof to become reduced further occurs together with the diameter enlargement, that is, the width in the radial direction becomes large over the whole periphery.

When the deformation of the back-up ring 52 progresses until both the end parts in the radial direction of the back-up ring 52 (specifically, the inner peripheral side end part of the first back-up ring 53 and the outer peripheral side end part of the second back-up ring 54) abut on the inner peripheral surface of the inner peripheral wall 20 and the bottom wall 47a in the radial direction of the groove 47 of the mouthpiece 40, the gap in the radial direction between the inner peripheral surface of the inner peripheral wall 20 of the container main body 10 and the outer peripheral surface of the mouthpiece 40 is closed by the back-up ring 52. Therefore, according to the structure of the high-pressure tank 1, it is possible not only to seal the space between the inner peripheral wall 20 of the container main body 10 and the mouthpiece 40 by using the elastically deformable O ring 51, but also to prevent a phenomenon in which a part of the O ring 51 enters the space between the inner peripheral wall 20 of the container main body 10 and the mouthpiece 40, which is caused by the filling of the high-pressure gas into the tank chamber 11 by using the back-up ring 52 whose width in the radial direction can be enlarged.

Further, in the high-pressure tank 1 according to the embodiment, as illustrated in FIG. 6, more specifically, the abutting between the first back-up ring 53 and the second back-up ring 54 by the pressing from the O ring 51 first starts between the first low angle inclined part 55a of the inclined surface part 55 of the first back-up ring 53 and the outer diameter side part of the second low angle inclined part 56a of the inclined surface part 56 of the second back-up ring 54. At this time, the first back-up ring 53 applies a pressing force F1 to the second back-up ring 54 in the axial direction A. Then, when the pressing from the O ring 51 to the back-up ring 52 continues, the abutting between the first back-up ring 53 and the second back-up ring 54 is shifted to a space between the first low angle inclined part 55a and the inner diameter side part of the second low angle inclined part 56a by sliding between the first low angle inclined part 55a and the second low angle inclined part 56a.

The angles $\alpha1$ and $\beta1$ with respect to the axial direction A of the first low angle inclined part 55a and the second low angle inclined part 56a are smaller than the angles $\alpha2$ and $\beta2$ with respect to the axial direction A of the first high angle inclined part 55b and the second high angle inclined part 56b. Therefore, during the sliding of the first low angle inclined part 55a and the second low angle inclined part 56a, a change amount of a pressing force F2 by which the first back-up ring 53 (specifically, the first low angle inclined part 55a) presses the second back-up ring 54 (specifically, the second low angle inclined part 56a) outwardly in the radial direction is greater than a change amount of a pressing force F2 outwardly in the radial direction during the sliding between the first high angle inclined part 55b and the second high angle inclined part 56b per unit amount of displacement X in the axial direction A of the first back-up ring 53. The state in which the change amount of the pressing force F2 per the unit displacement amount is relatively large is continued until the displacement X of the first back-up ring 53 reaches a predetermined displacement where the position of the corner part 55c of the inclined surface part 55 coincides with the position of the corner part 56c of the inclined surface part 56 of the second back-up ring 54.

Figure 7:
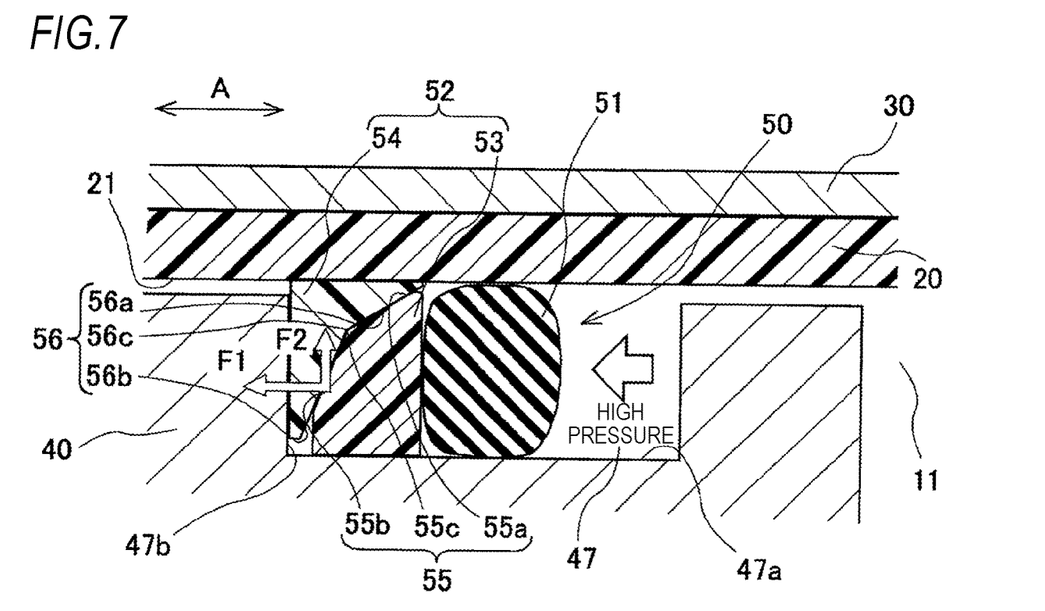
FIG. 7 is an enlarged cross-sectional view of the seal structure of the high-pressure tank according to the embodiment at the time of high-pressure action from the tank chamber.

Next, after the displacement X of the first back-up ring 53 reaches the predetermined displacement by allowing the tank chamber 11 to reach a high-pressure state higher than predetermined pressure, as illustrated in FIG. 7, the abutting between the first back-up ring 53 and the second back-up ring 54 by the pressing from the O ring 51 is shifted to the space between the first high angle inclined part 55b of the inclined surface part 55 of the first back-up ring 53 and the second high angle inclined part 56b of the inclined surface part 56 of the second back-up ring 54.

As described above, the angles $\alpha2$ and $\beta2$ are larger than the angles $\alpha1$ and $\beta1$. Therefore, during the sliding between the first high angle inclined part 55b and the second high angle inclined part 56b, even though the force F1 pressing in the axial direction A from the first back-up ring 53 to the second back-up ring 54 is the same, the change amount of the pressing force F2 by which the first back-up ring 53 (specifically, the first high angle inclined part 55b) presses the second back-up ring 54 (specifically, the second high angle inclined part 56b) outwardly in the radial direction is smaller than the change amount of the pressing force F2 outwardly in the radial direction during the sliding between the first low angle inclined part 55a and the second low angle inclined part 56a per unit amount of the displacement X in the axial direction A of the first back-up ring 53.

As described above, in the seal structure of the high-pressure tank 1, the abutting between the inclined surface parts 55 and 56 of the first and second back-up rings 53 and 54 is generated at the first and second low angle inclined parts 55a and 56a having a relatively small inclination angle with respect to the axial direction A, after which the abutting therebetween is shifted to the first and second high angle inclined parts 55b and 56b having a relatively large inclination angle with respect to the axial direction A.

According to the abutting timing of the inclined surface parts 55 and 56, during the sliding of the first and second low angle inclined parts 55a and 56a, since the pressing force F2 applied from the first back-up ring 53 to the second back-up ring 54 outwardly in the radial direction can be increased, even though the tank chamber 11 is in a low pressure state, it is possible not only to sufficiently secure the force for enlarging the diameter of the back-up ring 52, but also to promptly enlarge the diameter of the back-up ring 52 by the pressing of the O ring 51. Therefore, the gap in the radial direction between the inner peripheral wall 20 and the mouthpiece 40 can be closed by the back-up ring 52 in such a manner that the outer peripheral side end part of the back-up ring 52 surely and promptly abuts on the inner peripheral surface of the inner peripheral wall 20 of the container main body 10.

Further, during the sliding of the first and second high angle inclined parts 55b and 56b after the sliding of the first and second low angle inclined parts 55a and 56a, it is possible to reduce the pressing force F2 applied outwardly in the radial direction from the first back-up ring 53 to the second back-up ring 54. Therefore, after the outer peripheral side end part of the back-up ring 52 abuts on the inner peripheral surface of the inner peripheral wall 20 of the container main body 10 such that the gap in the radial direction between the inner peripheral wall 20 and the mouthpiece 40 is closed by the back-up ring 52, it is possible to suppress a load caused by the diameter enlargement from the back-up ring 52 toward the inner peripheral wall 20 from being excessively generated.

Therefore, according to the seal structure of the high-pressure tank 1, it is possible not only to secure the sealing properties of the O ring 51 in such a manner that the gap in the radial direction between the inner peripheral wall 20 of the container main body 10 and the mouthpiece 40 is closed by deformation in the radial direction of the back-up ring 52, but also to suppress the pressing force in the radial direction from the back-up ring 52 to the inner peripheral wall 20 of the container main body 10 after the gap in the radial direction is closed. Particularly, since the inner peripheral wall 20 of the container main body 10 is a member made of a resin, when the force for pressing the inner peripheral wall 20 outwardly in the radial direction by the back-up ring 52 is excessive, there exists a possibility that the inner peripheral wall 20 thereof may be damaged. On the other hand, in the embodiment, as described above, since the force for pressing the inner peripheral wall 20 made of the resin outwardly in the radial direction can be suppressed to be small by the diameter enlargement deformation of the back-up ring 52, the damage of the inner peripheral surface of the inner peripheral wall 20 by the load from the back-up ring 52 and the deterioration of the breaking strength of the whole container main body 10 can be surely prevented.

Figure 5:
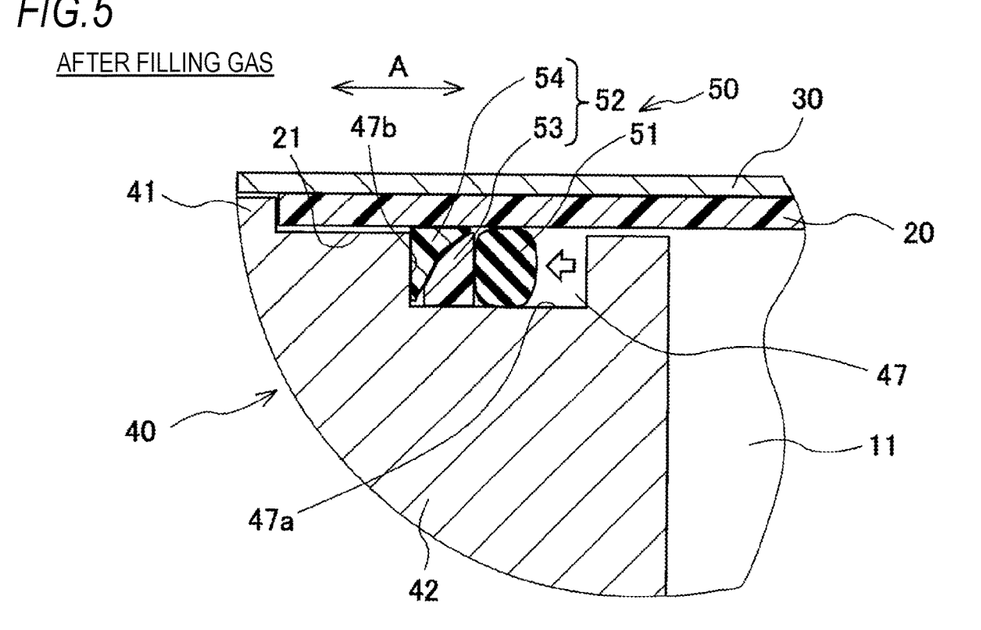
FIG. 5 is an enlarged cross-sectional view of the seal region indicated by the broken line in FIG. 2 of the high-pressure tank according to the embodiment after gas is filled into a tank chamber.

Meanwhile, in the above-described embodiment, the back-up ring 52 is formed of the first and second back-up rings 53 and 54 that are formed separately from each other, and the inclined surface parts 55 and 56 are superimposed on each other in a state where the inclined surface parts 55 and 56 are opposite to each other. Further, as described in FIGS. 4 and 5, the first back-up ring 53 is disposed closer to the side of the tank chamber 11 in the axial direction A and closer to the inner side in the radial direction than the second back-up ring 54 in the groove 47. The first back-up ring 53 is formed so as to have the inclined surface part 55 whose outer diameter gradually decreases from the side of the tank chamber 11 in the axial direction A to the side opposite thereto, and the inclined surface part 55 includes the first low angle inclined part 55a having a relatively small angle inclined with respect to the axial direction A; the first high angle inclined part 55b having a relatively large angle inclined with respect to the axial direction A; and the crest folding corner part 55c via which the first low angle inclined part 55a and the first high angle inclined part 55b are connected to each other. Further, the second back-up ring 54 is formed so as to have the inclined surface part 56 whose inner diameter gradually decreases from the side of the tank chamber 11 in the axial direction A to the side opposite thereto, and the inclined surface part 56 includes the second low angle inclined part 56a having a relatively small angle inclined with respect to the axial direction A; the second high angle inclined part 56b having a relatively large angle inclined with respect to the axial direction A; and the root folding corner part 56c via which the second low angle inclined part 56a and the second high angle inclined part 56b are connected to each other.

Figure 8:
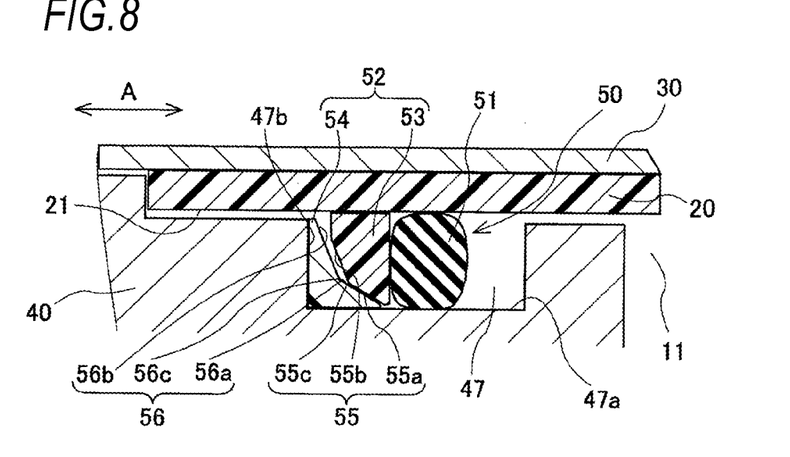
FIG. 8 is an enlarged cross-sectional view of a seal structure of a high-pressure tank according to a first modification of the present invention at an initial stage of pressure action from a tank chamber.

However, the present invention is not limited thereto. As illustrated in FIG. 8, the first back-up ring 53 may be formed so as to have the inclined surface part 55 whose inner diameter gradually increases from the side of the tank chamber 11 in the axial direction A to the side opposite thereto, and the second back-up ring 54 may be formed so as to have the inclined surface part 56 whose outer diameter gradually increases from the side of the tank chamber 11 in the axial direction A to the side opposite thereto.

Figure 9:
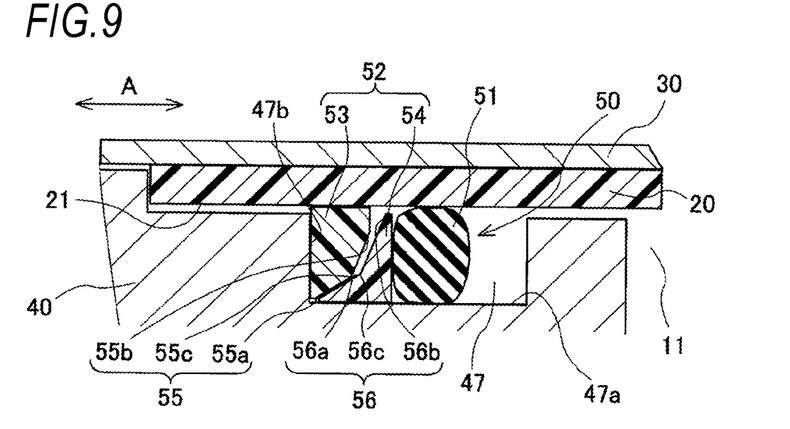
FIG. 9 is an enlarged cross-sectional view of a seal structure of a high-pressure tank according to a second modification of the present invention at an initial stage of pressure action from a tank chamber.

Further, as illustrated in FIG. 9, the first back-up ring 53 may be disposed further to the side opposite to the side of the tank chamber 11 in the axial direction A and further to the outer side in the radial direction than the second back-up ring 54 at the inside of the groove 47. In this case, the first back-up ring 53 is formed so as to have the inclined surface part 55 whose inner diameter gradually decreases from the side of the tank chamber 11 in the axial direction A to the side opposite thereto. Further, the second back-up ring 54 is formed so as to have the inclined surface part 56 whose outer diameter gradually decreases from the side of the tank chamber 11 in the axial direction A to the side opposite thereto.

Figure 10:
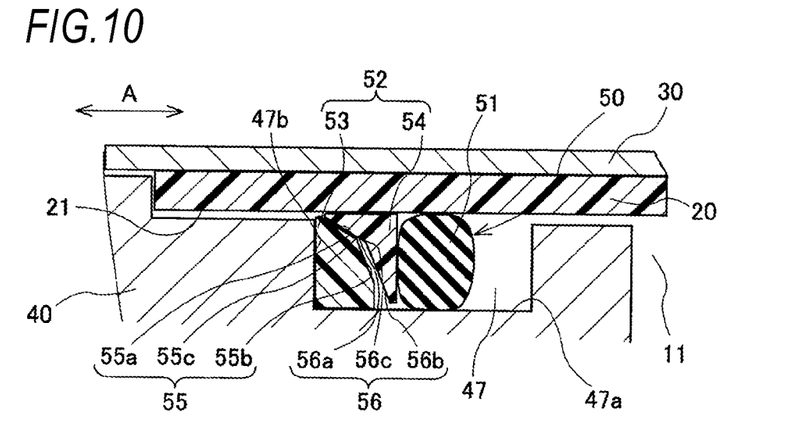
FIG. 10 is an enlarged cross-sectional view of a seal structure of a high-pressure tank according to a third modification of the present invention at an initial stage of pressure action from a tank chamber.

Further, as illustrated in FIG. 10, the first back-up ring 53 may be disposed further to the side opposite to the side of the tank chamber 11 in the axial direction A and further to the inner side in the radial direction than the second back-up ring 54 at the inside of the groove 47. In this case, the first back-up ring 53 is formed so as to have the inclined surface part 55 whose outer diameter gradually increases from the side of the tank chamber 11 in the axial direction A to the side opposite thereto. Further, the second back-up ring 54 is formed so as to have the inclined surface part 56 whose inner diameter gradually increases from the side of the tank chamber 11 in the axial direction A to the side opposite thereto.

Figure 11:
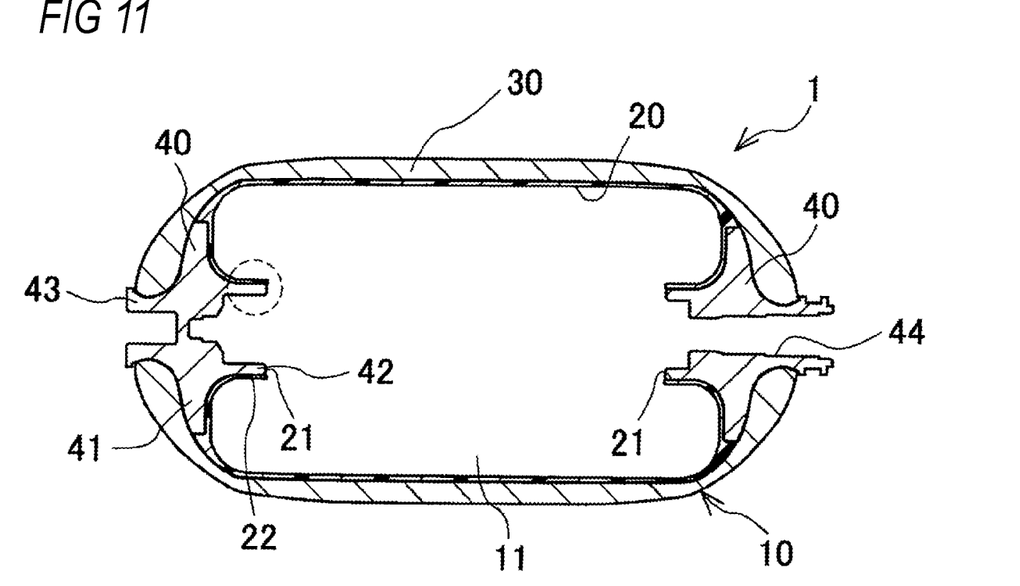
FIG. 11 is a cross-sectional view of a high-pressure tank according to a fourth modification of the present invention.
Figure 12:
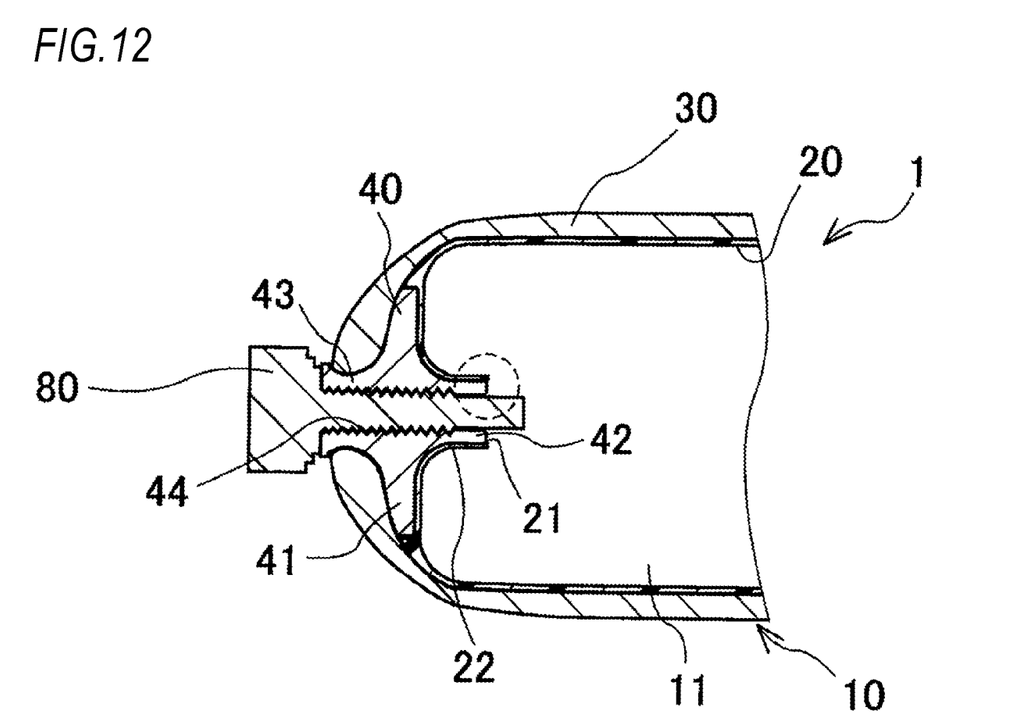
FIG. 12 is a cross-sectional view of a main part of a high-pressure tank according to a fifth modification of the present invention.

Further, in the above-described embodiment, the inner peripheral wall 20 which is a liner in which the mouthpiece 40 is fitted into the opening hole 21 is formed in a cylindrical shape so as to extend linearly in the axial direction A without being folded back at the end part in the axial direction, and the seal member 50 closes a gap which is opened in the radial direction between the inner peripheral surface of the inner peripheral wall 20 and the outer peripheral surface of the fitting part 42 of the mouthpiece 40. However, the present invention is not limited thereto, and, as illustrated in FIGS. 11 and 12, the present invention may be applied in such a manner that the inner peripheral wall 20 is formed so as to be folded back at the end part in the axial direction, and the seal member 50 closes a gap which is opened in the radial direction between the inner peripheral surface of the folded back part 22 of the inner peripheral wall 20 and the outer peripheral surface of the fitting part 42 of the mouthpiece 40.

Further, in the above-described embodiment, the high-pressure tank 1 in which the mouthpiece 40 is fitted into the opening hole 21 of the inner peripheral wall 20 which is the liner of the container main body 10 is a structure including the seal member 50 for closing the gap opened in the radial direction between the inner peripheral surface of the inner peripheral wall 20 and the outer peripheral surface of the mouthpiece 40. However, the present invention is not limited thereto. As illustrated in FIG. 12, the high-pressure tank 1 in which a valve 80 is screwed and mounted on the communication hole 44 which is an opening hole provided in the mouthpiece 40 may be formed as a structure including the seal member 50 for closing a gap opened in the radial direction between an inner peripheral surface of the mouthpiece 40 and an outer peripheral surface of the valve 80, and may be applied to the sealing properties of the seal member 50.

Further, in the above-described embodiment, the first back-up ring 53 includes the inclined surface part 55 whose an inclination angle with respect to the axial direction A changes at the crest folding corner part 55c, and the second back-up ring 54 includes the inclined surface part 56 whose an inclination angle with respect to the axial direction A changes at the root folding corner part 56c. However, the present invention is not limited thereto. The first back-up ring 53 is not required to include the inclined surface part 55 whose an inclination angle with respect to the axial direction A changes at the crest folding corner part 55c, and, alternatively, the shape of the first back-up ring 53 may have any shape such as, for example, a circular arc shape in cross section, and the like when the abutting between the first back-up ring 53 and the second back-up ring 54 by the pressing from the O ring 51 is performed between the second high angle inclined part 56b of the second back-up ring 54 and the first back-up ring 53 after being performed between the second low angle inclined part 56a of the second back-up ring 54 and the first back-up ring 53.

Further, in the above-described embodiment, in a case where the first back-up ring 53 formed separately from the second back-up ring 54 is made of a resin, when the first back-up ring 53 is pressed against the O ring 51, the gap is formed between the first back-up ring 53 and the second back-up ring 54 due to the elastic deformation thereof, whereby there exists a possibility that the O ring 51 may be sandwiched in the gap. Therefore, the first back-up ring 53 may be formed by two-color molding, and the like so that the gap is hardly formed between the first back-up ring 53 and the second back-up ring 54 even though the elastic deformation occurs, whereby the rigidity of the first back-up ring 53 may be partially reduced.

Further, the present invention is not limited to the above-described embodiments and the modifications, and various modifications can be made within the scope without departing from the spirit of the present invention.

What is claimed is:

1. A seal structure of a high-pressure tank for use sealing a space between a first member having a cylindrical shape and a second member, the high-pressure tank including: the first member in which an opening hole is provided at an end part in an axial direction and a tank chamber is formed inside; and the second member which is fitted into the opening hole of the first member and provided with an annular groove formed on an outer peripheral surface, the seal structure comprising:
    a seal member, having an annular shape, configured to be disposed on a tank chamber side in the groove and to be moved by being pressed in the axial direction opposite to the tank chamber side by a pressure of the tank chamber; and
    a first back-up member and a second back-up member configured to be disposed further to a side opposite to the tank chamber side than the seal member in the groove, each of the first back-up member and the second back-up member including an inclined surface part respectively opposite to each other, the first back-up member and the second back-up member being deformable so that a whole width in a radial direction becomes large by sliding therebetween which is caused by being pressed from the seal member moved by the pressure of the tank chamber in a state where the inclined surface parts abut on each other,
    wherein the inclined surface part of the first back-up member includes:
        a first low angle inclined part inclined at a predetermined angle with respect to the axial direction of the first member;
        a first high angle inclined part inclined at an angle larger than the predetermined angle with respect to the axial direction of the first member, and configured to generate abutting later than abutting timing at the first low angle inclined part at the time of the pressure from the seal member; and
        a crest folding corner part in which the first low angle inclined part and the first high angle inclined part are connected to each other; and
    wherein the inclined surface part of the second back-up member includes:
        a second low angle inclined part inclined at a corresponding angle corresponding to the predetermined angle of the first low angle inclined part with respect to the axial direction of the first member;
        a second high angle inclined part inclined at an angle larger than the corresponding angle with respect to the axial direction of the first member, and configured to generate abutting later than abutting timing at the second low angle inclined part at the time of the pressure from the seal member; and
        a root folding corner part via which the second low angle inclined part and the second high angle inclined part are connected to each other, and
    wherein the first low angle inclined part, the first high angle inclined part, the second low angle inclined part, and the second high angle inclined part are surfaces and are linear in cross-section.

2. The seal structure of the high-pressure tank according to claim 1, wherein:
    the second back-up member is disposed closer to the tank chamber side than the first back-up member in the groove; and
    the first back-up member is disposed so that the first low angle inclined part is positioned closer to the tank chamber side than the first high angle inclined part.

3. The seal structure of the high-pressure tank according to claim 2, wherein
    the first back-up member is disposed so that the first low angle inclined part is positioned closer to the outer side in the radial direction than the first high angle inclined part.

4. The seal structure of the high-pressure tank according to claim 1, wherein the first member is a liner made of a resin.

5. The seal structure of the high-pressure tank according to claim 4, wherein
    the second member is a mouthpiece mounted on the end part in the axial direction of the first member.

* * * * *